(12) United States Patent
Rawal et al.

(10) Patent No.: US 8,367,178 B1
(45) Date of Patent: Feb. 5, 2013

(54) CARBON PHENOLIC ABLATIVE GAP FILLER

(75) Inventors: Suraj P. Rawal, Littleton, CO (US); William H. Willcockson, Morrison, CO (US); Richard A. Hund, Sedalia, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 325 days.

(21) Appl. No.: 12/704,793

(22) Filed: Feb. 12, 2010

Related U.S. Application Data

(60) Provisional application No. 61/152,594, filed on Feb. 13, 2009.

(51) Int. Cl.
*B32B 3/10* (2006.01)
*B32B 3/12* (2006.01)
(52) U.S. Cl. ............... 428/47; 428/48; 428/49; 428/117
(58) Field of Classification Search ................... 428/117, 428/58, 49, 47, 48
See application file for complete search history.

(56) References Cited

U.S. PATENT DOCUMENTS

| | | | | |
|---|---|---|---|---|
| 4,031,059 A | * | 6/1977 | Strauss | 523/179 |
| 4,100,322 A | * | 7/1978 | Seibold et al. | 442/136 |
| 6,558,785 B1 | * | 5/2003 | Rawal et al. | 428/312.8 |
| 6,955,853 B1 | * | 10/2005 | Tran et al. | 428/325 |
| 7,662,459 B1 | * | 2/2010 | Zell | 428/116 |
| 7,919,167 B1 | * | 4/2011 | Rawal et al. | 428/117 |
| 7,998,295 B2 | * | 8/2011 | Thatcher et al. | 156/81 |
| 2003/0022983 A1 | * | 1/2003 | Barney et al. | 524/588 |

FOREIGN PATENT DOCUMENTS
JP 56090850 A * 7/1981

OTHER PUBLICATIONS

Tran, Huy K.; Johnson, Christine E.; Rasky, Daniel J.; Hui, Frank C. L.; Hsu, Ming-Ta; Chen, Timothy; Chen, Y. K.; Paragas, Daniel; Kobayashi, Loreen, "Phenolic Impregnated Carbon Ablators (PICA) as Thermal Protection Systems for Discovery Missions", NASA, Ames Research Center, Apr. 1997. http://ntrs.nasagov/archive/nasa/casi.ntrs.nasa.gov/19970017002_1997027245.pdf.

* cited by examiner

*Primary Examiner* — Alexander Thomas
(74) *Attorney, Agent, or Firm* — McDermott, Will & Emery LLP

(57) ABSTRACT

A robust, chemically, structurally, and thermodynamically compatible ablative gap filler that can be processed with ease is provided. The gap filler uses a carbon phenolic mixture that has nearly the same material property characteristics as the adjacent PICA or carbon phenolic tiles. The gap filler is applied into the gaps using an innovative processing approach that involves preparation of a 'dry mixture' of the ingredients, which is then packed manually or robotically (if needed) into the gaps. During the packing process, the dry mixture may be vented, and pressed periodically to ensure that there are no trapped voids. After each gap is adequately filled with the mixture, the assembly is bagged and cured in the oven at about 250 or 300° F. for about 1.5 to 2 hours. The gap filler thereby forms a bond with the adjacent PICA or carbon phenolic tiles, without degrading or modifying the properties at any of the interfaces (e.g., with the tiles, adhesives, substrate, etc.).

28 Claims, 1 Drawing Sheet

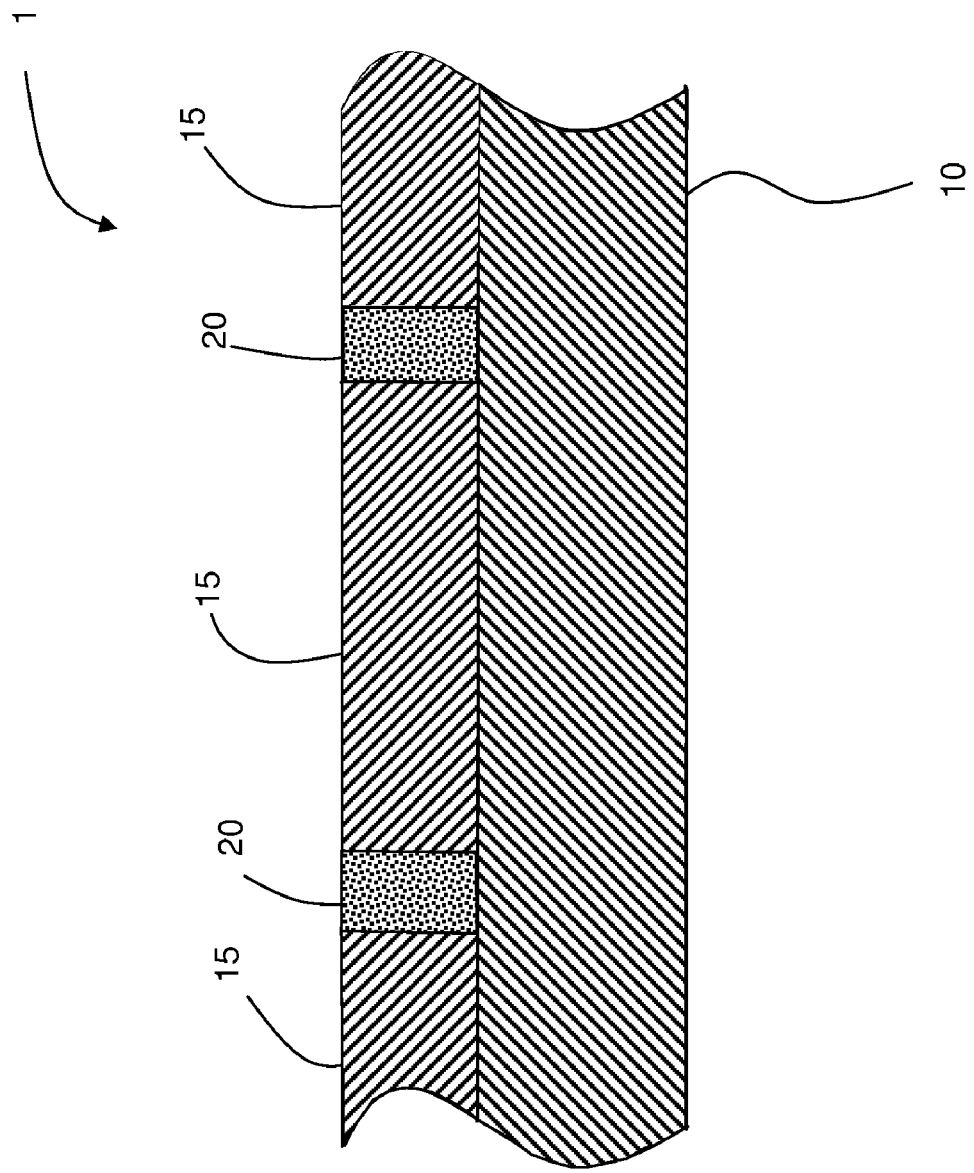

CARBON PHENOLIC ABLATIVE GAP FILLER

CROSS-REFERENCES TO RELATED APPLICATIONS

This patent application claims priority to U.S. Provisional Patent Application Ser. No. 61/152,594 filed Feb. 13, 2009, the disclosure of which is incorporated herein by reference in its entirety.

STATEMENT REGARDING FEDERALLY SPONSORED RESEARCH OR DEVELOPMENT

Not Applicable.

BACKGROUND OF THE INVENTION

The present invention generally relates to ablative heat shields for atmospheric entry or re-entry and, in particular, to carbon phenolic ablative compositions for use with such heat shields.

Ablator materials (e.g., carbon phenolic-based ablators, such as phenolic impregnated carbon ablator (PICA)), are often used as the thermal protection system in the fabrication of aeroshells of space vehicle re-entry systems. Such aeroshells have been fabricated by bonding multiple tiles of these carbon phenolic ablators onto a substrate structure, and then filling the gaps between these tiles with room temperature vulcanizing type materials such as RTV silicone. During the gap filling process, a part of the RTV silicone has the tendency to penetrate into the porosity of adjacent tiles. One issue with these RTV silicone-type materials is that they exhibit a very high coefficient of thermal expansion when compared to the ablative tile materials the gaps between which they are used to fill. Therefore, during heating (e.g., during re-entry and thermal soakback conditions), the expansion and contraction of the gap filler material, particularly where it has bonded with adjacent tiles, can trigger the dislodging or chipping of the adjacent tiles, negatively impacting the smooth outer surface (and thereby the performance) of the ablative heat shield material.

SUMMARY OF THE INVENTION

In accordance with the invention, a robust gap filler composition is provided for use in heat shield applications. The gap filler composition uses a carbon phenolic composition comprising carbon and phenolic resin. In one exemplary embodiment, the carbon is in the form of carbon fibers. Additional exemplary materials include other low-density low thermal conductivity forms of carbon such as carbon hollow spheres, carbon aerogels, nanotubes, fullerene, non-fibrous graphite, and the like. In another exemplary embodiment, the phenolic resin and the composition as a whole is in powder or particle form, which can provide for easy application and packing of the gap filler composition into gaps between ablative tiles. In yet another exemplary embodiment, the phenolic resin is in the form of a mixture of solid phenolic resin particles and phenolic resin microballoons. Filler materials such as silica particles (e.g., silica microballoons) may be added to the composition to reduce density.

The gap filler may be applied into the gaps using an innovative processing approach that involves preparation of a dry mixture of the ingredients in powder or particle form, which is then packed manually or robotically (if needed) into open spaces in a heat shield structure. During the packing process, the dry mixture may be vented, and pressed periodically to ensure that there are no trapped voids. After the gaps or spaces are adequately filled with the mixture, the assembly is vacuum bagged or placed in a sealed vacuum environment and heat-cured. The ablative composition forms a bond with adjacent elements such as ablative tiles or a multi-cell support element. It will be appreciated that the ablative composition functions as an ablator material on its own, thus making it highly compatible with ablator tiles in a space vehicle heat shield.

In one exemplary embodiment of the invention, the gap filler composition may be used to fill gaps between ablative tiles such as PICA or carbon phenolic tiles mounted onto a substrate. In another exemplary embodiment of the invention, the gap filler composition may be used to fill gaps in a multi-cell support element such as a phenolic fiberglass honeycomb core, attached to a substrate, to form a monolithic heat shield element. In yet another exemplary embodiment, the gap filler composition may be used to repair gaps (e.g., caused by damage) in an existing heat shield.

In one exemplary embodiment of the invention, there is provided an ablative heat shield for spacecraft atmospheric entry or re-entry, comprising:
  (a) a substrate
  (b) a plurality of ablative tiles affixed to the substrate in a configuration such that the heat shield comprises one or more gaps between the ablative tiles or a multi-cell support element affixed to the substrate, and
  (c) an ablative composition disposed in the gap(s) or cells, the ablative composition comprising:
    (1) carbon and
    (2) a phenolic resin.

In another exemplary embodiment of the invention, a method for making an ablative heat shield for spacecraft atmospheric entry or re-entry, comprising the steps of:
  (a) affixing a plurality of ablative tiles such that there are one or more gaps between said ablative tiles or affixing a multi-cell support element to a substrate,
  (b) disposing an ablative composition in said gap(s) or cells, the ablative composition comprising:
    (1) carbon and
    (2) a phenolic resin, and
  (c) curing the ablative composition.

In yet another exemplary embodiment of the invention, a method of repairing an ablative heat shield for spacecraft atmospheric entry or re-entry having one or more gaps in the surface thereof is provided, comprising the steps of:
  (a) disposing an ablative composition in said one or more gaps, said ablative composition comprising:
    (1) carbon and
    (2) a phenolic resin, and
  (b) curing said ablative composition.

Exemplary embodiments of the invention effectively fills spaces such as gaps between tiles or cells in multi-cell support elements in ablative heat shields for spacecraft atmospheric entry with a composition that is highly compatible with carbon phenolics and PICA ablative heat shields, while limiting adverse impacts on the heat shield assembly. The ablative composition bonds well to adjacent tile material without voids and without anomalous effects such as chipping or dislodging of tiles, and can be applied in dry or wet form. When exposed to heat conditions of the type encountered during atmospheric entry, the ablative composition ablates at a rate that is compatible with known ablative tiles. These and other advantages and features will become more apparent from the following description.

BRIEF DESCRIPTION OF THE DRAWINGS

FIG. 1 represents a cross-sectional view of a portion of a heat shield according to the invention.

DETAILED DESCRIPTION

Ablative spacecraft atmospheric entry tiles are well-known in the art, and do not require detailed description herein. In one nonlimiting exemplary embodiment, the tiles may be fabricated from carbon and phenolic resins with optional crosslinkers, fillers, and other additives. Avcoat 5026 is a well-known carbon phenolic ablator that was successfully used on the Apollo space missions, and is described in detail by James Pavloski and Leslie St. Leger, "Apollo Experience Report—Thermal Protection Subsystem", NASA Technical Note D-7564, January, 1974; and Randolph Graves, Jr. and William Witte, "Flight Test Analysis of Apollo Heat-Shield Material Using the Pacemaker Vehicle System", NASA Technical Note D-4713, August, 1968, the disclosures of which are incorporated herein by reference in their entirety. Other types of ablative spacecraft atmospheric entry tiles include carbon-carbon tiles, which are also well-known in the art.

The density of traditional carbon phenolic tiles may present a problem for certain applications where meeting maximum payload requirements is a concern. The quest for lighter weight ablative materials has led to the development of materials such as Lightweight Ceramic Ablators ("LCA") and Phenolic Impregnated Carbon Ablators ("PICA"). Detailed technical descriptions of these can be found, for example in H. Tran, "Development of Lightweight Ceramic Ablators and Arc-Jet Test Results," NASA Technical Memorandum 108798, National Aeronautics and Space Administration, Ames Research Center, 1994, and H. Tran et al., "Phenolic Impregnated Carbon Ablators (PICA) as Thermal Protection Systems for Discovery Missions," NASA Technical Memorandum 110440, National Aeronautics and Space Administration, Ames Research Center, April 1997, the disclosures of which are each incorporated herein by reference in their entirety. The tiles are generally formed from a lightweight matrix such as a carbon or ceramic matrix (e.g., a carbon foam or fiber mat or ceramic fiber mat) that has been impregnated with a high temperature resin such as a phenolic resin followed by curing of the resin.

One advantage of exemplary embodiments of the present invention is that while the described composition can be used with any type of ablative heat shield system, when it is used with carbon phenolic ablative tiles such as traditional carbon phenolic tiles or PICA, it offers a high degree of chemical and physical compatibility with those tiles since the ablative composition is based on carbon phenolic compositions.

In one exemplary embodiment, the ingredients can be mixed in various amounts in order to achieve target density along with ablative performance. In one nonlimiting exemplary embodiment, the carbon constituent(s) are present in an amount of 25% to 40% by weight and the phenolic resin constituent is present in an amount of 40% to 70% by weight. Lightweight heat-tolerant fillers such as silica microballoons may optionally be blended into the composition in an amount of 0% to 40% by weight to reduce density, generally without adversely impacting ablative performance.

The phenolic resins used in the practice of the invention are well-known in the art, and include various reaction products of phenol with simple aldehydes like formaledehyde. The resin may be in solid particle or powder form for embodiments where the ablative composition is in solid particle or powder form, which is generally prepared by reacting a molar excess of phenol with an aldehyde in the presence of an acid catalyst, which results in an uncured solid resin that requires the addition of a crosslinking agent (e.g., a polyamine such as hexamethylenetetramine) for thermal curing to form a crosslinked resin. Useful commercially available solid phenolic resins include Novalac-type phenolic powder resin DURITE® FD-2170 made by Hexion, and other well-known phenol formaldehyde resins. A portion of phenolic resin in solid particle or powder form may be in the form of phenolic resin microballoons or microspheres, such as PHENOSET® microspheres made by Asia Pacific Microspheres. Phenolic resin microballoons can have particle sizes (diameters) ranging from 20 μm to 150 μm. In an alternate exemplary embodiment, the phenolic resin may be in liquid form, which is generally prepared by reacting a molar excess of aldehyde with phenol in the presence of an alkaline catalyst and terminating the reaction prior to the commencement of substantial crosslinking. The reaction of liquid phenolic resin is then carried to completion, including crosslinking, during thermal curing. Useful commercially available liquid phenolic resins include SC1008 or dilute solutions of phenolic powder resins.

In an exemplary embodiment of the invention, the carbon material in the ablative composition is in the form of carbon fibers. Carbon fibers are well-known in the art, and are generally prepared by pyrolysis of polymeric or organic materials (e.g., polyacrylonitrile fibers, rayon fibers, or pitch fibers) under an inert gas such as argon, resulting in carbon fibers composed primarily of carbon atoms arranged in a graphite crystal structure. Depending on processing conditions, the arrangement of the graphene sheets in the carbon fibers may be primarily graphitic, primarily turbostratic, or a hybrid structure with both graphitic and turbostratic structures. In the case of carbon used in PICA ablative tiles, individual carbon fibers are wound together to form a carbon yarn, which can then be woven to form a carbon fiber matrix for impregnation with a phenolic resin. In the case of carbon used in the ablative composition, the fibers may be chopped into fibrous particles having lengths ranging from 50 μm to 1000 μm and diameters ranging from 5 μm to 10 μm.

Other, non-fiber, forms of carbon can also be used in the practice of the invention. In certain exemplary embodiments, the carbon used in the practice of the invention has an ordered atomic structure to provide physical properties that enhance its contribution to the strength and physical robustness of the cured ablative composition in a space vehicle atmospheric entry ablative heat shield. Such ordered structure forms of carbon include, for example graphite (e.g., flake graphite, buckled graphite, rhombohedral graphite), fullerene in any of its various known forms, various graphene derivatives such as multi-walled nanotubes, single-walled nanotubes, nanobuds, and the like.

As disclosed above, the ablative composition useful in the practice of the invention may include lightweight inert fillers such as silica microballoons to adjust the density of the composition to desired targets. These fillers may be included in amounts of from 0% to 40% by weight of the ablative composition, and can have diameters ranging from 20 μm to 100 μm.

Turning now to FIG. 1, there is shown a cross-sectional view of a portion of an ablative heat shield 1 comprising a substrate 10 having thereon a plurality of ablative tiles 15. Gaps between the ablative tiles 15 are designated by the reference character 20, and are filled with an ablative composition as described herein. As shown in FIG. 1, an ablative heat shield is prepared by first affixing a plurality of ablative tiles to a substrate, leaving gaps between the tiles, using any conventional adhesive capable of withstanding temperatures to which the ablator/substrate interface will be subjected as is well-known in the art. Examples of useful adhesives include HT424 (manufactured by Cytec) or FM 32 (manufactured by Cytec). The substrate 10 may be any material known to be useful as heat shield substrate, such as steel alloys, or composite materials such as carbon-epoxy composites or carbon-cyanate ester composites. Alternatively or in conjunction with gaps purposely left between adjacent tiles, the ablative composition described herein may be used to fill gaps in a heat shield may result from damage or flaws in the tiles themselves. The ablative composition is then poured or injected into the gaps so as to substantially fill the gaps, and then the entire assembly is thermally cured using appropriate times and temperatures for the phenolic resin component of the ablative composition (e.g., temperatures of 120° C. to 177° C. for 2 to 6 hours). Unlike prior art RTV gap filler approaches where curing occurs fairly soon after the material is disposed into the gaps, the thermal curing of the ablative composition described herein allows for significant working time during for deployment and manipulation of the ablative composition, after which the entire assembly can be exposed to conditions to cure the ablative composition.

In an alternate exemplary embodiment of the invention, a multi-cell support element can be affixed to the substrate using an adhesive as described above. Useful multi-cell support elements include fiberglass phenolic honeycomb core materials such as Hexweb HRT® (manufactured by Hexcel), although any configuration and material of heat-resistant multi-cell support elements could be used. In one exemplary embodiment, the surface of the multi-cell support element is prepared in order to enhance adhesion between the ablative composition that will be used to fill the cells. Such surface preparation may be accomplished, for example, by treating the surface with a dilute solution (e.g., on the order of 10-35% in a solvent such as acetone) of phenolic resin prior to filling the cells with ablative composition.

As disclosed above, in one exemplary embodiment of the invention, the ablative composition is in dry particle or powder form. In this embodiment, the dry mixture of the blended constituents is manually or robotically poured into the gaps between ablative tiles or into the cells of a multi-cell support element, and the composition may then be packed or pressed into the gaps or cells to eliminate any void spaces prior to curing the entire assembly, followed by adding additional ablative composition of necessary. Elimination of void spaces can serve to minimize any shrinkage of mixture during cure, yielding a final height that is similar to the adjacent tiles. A known amount of the carbon phenolic dry mixture can be packed into a known volume of the gaps to provide indirect verification that the gap has been well packed with no voids (and/or that none of the materials have penetrated into or underneath adjacent tiles during packing). The dry mixture packing method is easily adaptable to fill the gaps of a variety of exemplary inter-tile or cell depths ranging from 0.5 to 8 cm, although any depth could be accommodated depending on the design parameters of the space vehicle atmospheric entry shield.

Example 1

A test sample was prepared by attaching three PICA ablative tiles to a carbon-resin composite substrate with adhesive in a configuration so as to provide a T-joint shaped gap line between the three tiles. A temporary border was placed around the outside edge of the test sample in order to retain material with which the gaps would be filled, and the top surface of the PICA tiles was covered with a protective tape, and a powder composition containing 40% by weight phenolic resin, 40% carbon fibers, and 20% phenolic microballoons was poured into the gaps along the gap line. Voids in the powder fill in the gaps were manually by physical manipulation with a pick, and additional powder composition was packed into the gaps, resulting in a density of powder composition in the gaps (measured by dividing total mass of powder disposed into the gaps by the calculated gap volume) of 0.45 g/cm$^3$. The initial total loose volume of powder composition was about 120% of the final packed volume. The protective tape was removed, and the assembly was vacuum bagged and baked at a temperature of 121° C. to 177° C. for 2-4 hours to cure the powder composition. The temporary border around the outside edge of the test sample was removed, and the sample was subjected to a standard NASA Arc jet test at 284 W/cm2 for 10 seconds, followed by a 171° C. soak-back temperature (as measured in the gap filler at 1.27 cm below the surface. After testing, the interface between the PICA tile and the composition in the gaps was smooth, with no anomalous results, such as pop-up or chipping of the tiles. The recession rate of the composition in the gap was equivalent to the recession rate of the PICA tiles themselves, receding only slightly less than the PICA tiles. Bond integrity between the composition in the gap, the PICA tiles, and the substrate was maintained.

Example 2

Sample 1

A test sample was prepared by attaching a commercially-available fiberglass phenolic flexible core honeycomb material to an aluminum plate substrate with adhesive. The surface of fiberglass phenolic core was treated with a 10% solution of phenolic resin and dried. A powder composition containing 40% by weight phenolic resin, 40% carbon fibers, and 20% phenolic microballoons was poured and packed into the honeycomb cells, and the test sample was baked to cure the powder composition. The test sample was subjected to arc jet testing at Boeing Technological Services Large Core Arc Tunnel (LCAT) facility using a conventional shear specimen configuration. The results showed excellent ablative performance and cohesiveness of the cured powder composition, and generally good adhesion of the cured powder composition to the fiberglass phenolic core.

Sample 2

A second test sample was prepared by attaching a commercially-available fiberglass phenolic flexible core honeycomb material to an aluminum plate substrate with adhesive. The surface of fiberglass phenolic core was treated with a 33% solution of phenolic resin and dried. A powder composition containing 40% by weight phenolic resin, 40% carbon fibers, and 20% phenolic microballoons was poured and packed into the honeycomb cells to a density of 0.38 g/cm$^3$, and the test sample was baked to cure the powder composition. The test sample was subjected physical testing methods, including cell-core push testing and flexure testing. The results showed excellent adhesion of the cured powder composition to the fiberglass phenolic core.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that ate known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

While the invention has been described in detail in connection with only a limited number of embodiments, it should be readily understood that the invention is not limited to such disclosed embodiments. Rather, the invention can be modified to incorporate variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An ablative heat shield for spacecraft atmospheric entry or re-entry, comprising:
    (a) a substrate,
    (b) an ablative structure affixed to the substrate, the ablative structure having open spaces present therein, and
    (c) an ablative composition disposed in said open spaces, said ablative composition comprising:
        (1) carbon, said carbon comprising about 25% to about 40% by weight of the ablative composition, and
        (2) a phenolic resin, said phenolic resin comprising about 40% to about 70% by weight of the ablative composition.

2. An ablative heat shield according to claim 1 wherein the phenolic resin is a phenol formaldehyde resin.

3. An ablative heat shield according to claim 1 wherein the phenolic resin further comprises a crosslinking agent.

4. An ablative heat shield according to claim 3 wherein the crosslinking agent is a polyamine.

5. An ablative heat shield according to claim 1 wherein the carbon in the ablative composition comprises carbon fibers.

6. An ablative heat shield according to claim 5 wherein said carbon fibers have an aspect ratio of 3:1 to 400:1.

7. An ablative heat shield according to claim 1 wherein the ablative composition further comprises silica microballoons.

8. An ablative heat shield according to claim 1 wherein said ablative structure comprises a plurality of ablative tiles affixed to the substrate in a configuration such that the heat shield comprises one or more gaps between said ablative tiles.

9. An ablative heat shield according to claim 8 wherein the ablative tiles comprise carbon and phenolic resin.

10. An ablative heat shield according to claim 9 wherein the ablative tiles comprise a carbon fiber mat impregnated with phenolic resin.

11. An ablative heat shield according to claim 1 wherein said ablative structure comprises a multi-cell support element affixed to the substrate.

12. A method of making an ablative heat shield for spacecraft atmospheric entry or re-entry, comprising the steps of:
    (a) affixing an ablative structure to a substrate, the ablative structure having open spaces present therein,
    (b) disposing an ablative composition in said open spaces, said ablative composition comprising:
        (1) carbon, said carbon comprising about 25% to about 40% by weight of the ablative composition, and
        (2) a phenolic resin, said phenolic resin comprising about 40% to about 70% by weight of the ablative composition, and
    (c) curing said ablative composition.

13. A method to claim 12 wherein the phenolic resin is a phenol formaldehyde resin.

14. A method according to claim 12 wherein the phenolic resin further comprises a crosslinking agent.

15. A method according to claim 14 wherein the crosslinking agent is a polyamine.

16. A method according to claim 12 wherein the carbon in the ablative composition comprises carbon fibers.

17. A method according to claim 16 wherein said carbon fibers have an aspect ratio of 3:1 to 400:1.

18. A method according to claim 12 wherein the ablative composition further comprises silica microballoons.

19. A method according to claim 12 wherein the phenolic resin of the ablative composition is in dry powder form.

20. A method according to claim 19 wherein the phenolic resin of the ablative composition comprises solid phenolic resin particles and phenolic resin microballoons.

21. A method according to claim 19 wherein the phenolic resin of the ablative composition further comprises a crosslinking agent.

22. A method according to claim 21 wherein the crosslinking agent is a polyamine.

23. A method according to claim 19 wherein the ablative composition is in dry powder form.

24. A method according to claim 23, further comprising packing or compressing the dry powder ablative composition into said open spaces prior to curing.

25. A method according to claim 12 wherein said ablative structure comprises a plurality of ablative tiles affixed to the substrate in a configuration such that the heat shield comprises one or more gaps between said ablative tiles.

26. A method according to claim 25 wherein the ablative tiles comprise carbon and phenolic resin.

27. A method according to claim 26 wherein the ablative tiles comprise a carbon fiber mat impregnated with phenolic resin.

28. A method according to claim 12 wherein said ablative structure comprises a multi-cell support element affixed to the substrate.

* * * * *